C. H. NOELL.
CORN PLANTER AND HILLER.
APPLICATION FILED JULY 30, 1910.
977,535.
Patented Dec. 6, 1910.
2 SHEETS—SHEET 1.
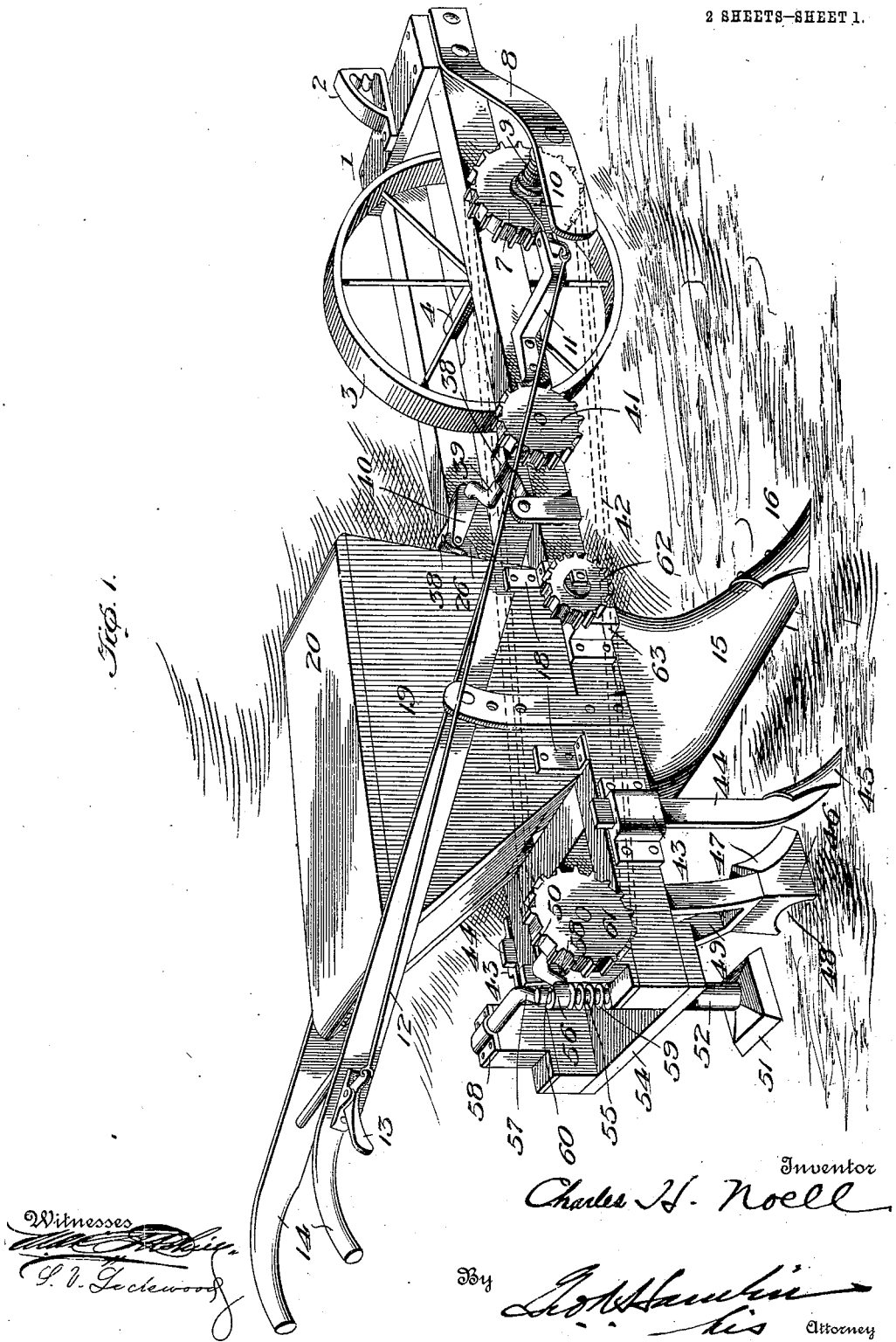
Witnesses
Inventor
Charles H. Noell
By
his Attorney C. H. NOELL.
CORN PLANTER AND HILLER.
APPLICATION FILED JULY 30, 1910.
977,535.
Patented Dec. 6, 1910.
2 SHEETS—SHEET 2.
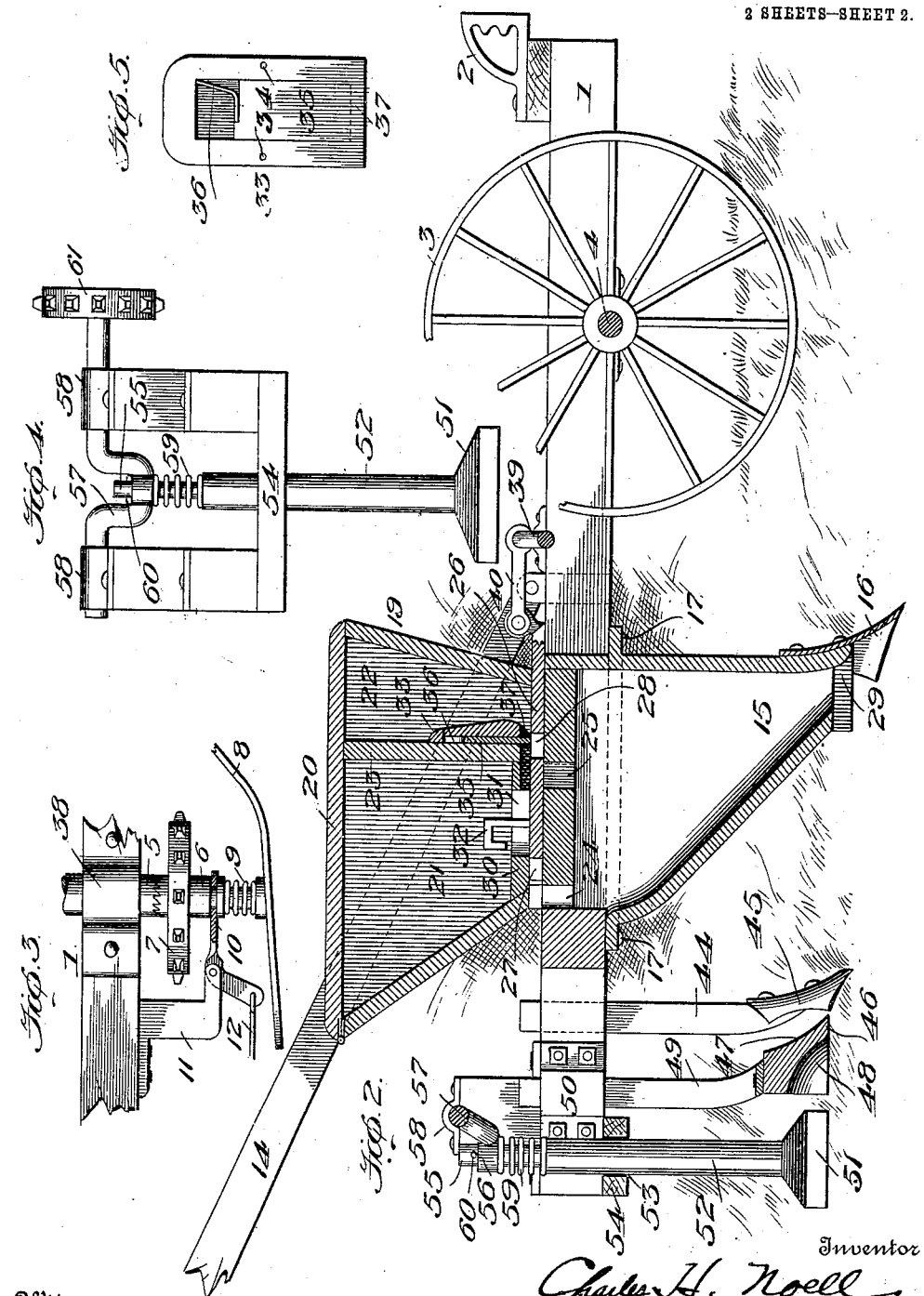
Witnesses
S. V. Lockwood
Inventor
Charles H. Noell
By
his Attorney

UNITED STATES PATENT OFFICE.

CHARLES H. NOELL, OF MONTVALE, VIRGINIA, ASSIGNOR OF ONE-HALF TO G. M. ARRINGTON, OF MONTVALE, VIRGINIA.

CORN PLANTER AND HILLER.

977,535.   Specification of Letters Patent.   Patented Dec. 6, 1910.

Application filed July 30, 1910. Serial No. 574,716.

*To all whom it may concern:*

Be it known that I, CHARLES H. NOELL, a citizen of the United States, residing at Montvale R. F. D., county of Bedford, and State of Virginia, have invented certain new and useful Improvements in Corn Planters and Hillers, of which the following is a specification.

This invention relates to corn planters and hillers.

This invention has for its object the provision of a corn planter and hiller of novel construction, composed of comparatively few parts, inexpensive to manufacture, and having improved means for dropping the corn or other seed, together with the requisite amount of fertilizer, into the furrow opened by a shoe, thereafter forming the hill, smoothing the ridge or crest of the hill and throwing aside stones or obstructions, and finally padding or tamping the hill at the places where the corn and fertilizer have been dropped.

The invention also contemplates the provision of a machine which can be used to advantage to merely drop the corn or other seed without the addition of the fertilizer, capable of adjustment to suit varying conditions of use, have a novel feeder for the corn and fertilizer, a novel fender and coverer, a novel padder or tamper, novel means for throwing the feeder and padder or tamper out of operation at will and other improved instrumentalities, all of which will appear more fully hereinafter.

The present machine is particularly adapted for use as a walking dropper and hiller.

In the accompanying drawings:—Figure 1 is a perspective view of the complete machine, dotted lines representing the sprocket chain for operating the different devices; Fig. 2, a longitudinal section thereof; Fig. 3, a detail plan view of the clutch controlling the sprocket chain; Fig. 4, a detail rear elevation of the padder or tamper; and Fig. 5, a detail rear view of the cut off for the feed slide.

The frame 1 is provided with a coupling or clevis 2 of any preferred construction, whereby the machine may be drawn along, and it has a traction wheel 3 whose shaft or axle 4 is journaled in suitable bearings on the frame and is provided with a serrated clutch member 5 (Fig. 3) adapted to be engaged with a similar member carried by the sleeve 6 of a sprocket wheel 7 which is slidable on the end of shaft 4, the latter being received in a guard or fender 8. A coil spring 9 surrounding the shaft 4 tends to hold the faces of the clutch in engagement so that the sprocket wheel 7 is normally turned on the movement of the machine, but the sleeve 6 is provided with an annular groove receiving the fork of a bell crank lever 10 pivoted to a bracket 11 on frame 1 and controlled by a rod 12 and a handle 13, the latter being carried by the handles 14 of the machine in convenient position to be readily grasped by the person using the machine. The mechanism described controls the operation of the feed slide and the padder or tamper as will presently appear.

There is a shoe or conducting tube 15 provided with a point or shovel 16 and suitably bolted to the frame 1 at 17. Removably secured by brackets or angle irons 18 to frame 1, is the hopper 19 which has a hinged cover 20 and is provided with a fertilizer compartment 21 and a seed compartment 22 separated by a suitable partition 23. Extending through the base of the hopper is a fertilizer dropping aperture 24 and a seed dropping aperture 25.

The feed slide 26 is provided with a notch 27 and with an aperture 28, the former being adapted to receive a measured quantity of the fertilizer and to drop it through the opening 24 at the same time that the aperture 28 receives a seed and drops it through the aperture 25 so that the seed and the fertilizer simultaneously fall into the shoe 15 and both pass out of the mouth 29 at the lower end thereof just back of the point or shovel 16.

There is provided in the bottom of the compartment 21 a member 30 having an aperture 31 through which the fertilizer passes to the feed slide and the latter carries an agitator 32 which prevents clogging of the fertilizer and insures proper feed thereof.

Referring to Figs. 2 and 5, there is shown a cut off in the seed chamber which consists of a casting 33 secured to the partition 23 by suitable fastenings passing through the openings 34, said casting having a slot in its rear face in which is a slide 35 which is normally urged downwardly by a spring 36. The lower end of the casting 33 is provided with a notch 37. Ordinarily the seed or kernel of corn dropping into the aperture 28 is of such size that it will pass underneath the slide 35 which allows but one kernel of corn to pass into said aperture, but if an unusally large kernel should be received in the opening, the slide 35 will yield, thereupon preventing splitting of the kernel and permitting the kernel to pass into the aperture 28 from which it will finally discharge through the aperture 25. The notch 37 permits this action.

Journaled in suitable bearings 38 on frame 1 is a crank shaft 39 which is connected by a pitman 40 to the slide 26 and is provided with a sprocket wheel 41 adapted to engage chain 42, shown by dotted lines, and to thereby be driven by the sprocket wheel 7. The size of these sprocket wheels in proportion to the size of wheel 3 is such that the feed of the fertilizer and corn will be timed to deposit them at the desired intervals in the furrow.

Vertically adjustable in straining clamp loops or brackets 43 on the sides of the frame 1 are the standards 44 of the hillers 45 which hill the furrow previously formed by the point 16. The bolts which hold the clamp bracket 43 can be readily loosened and permit the standards 44 to be raised or lowered as may be required, and on tightening the bolts, the standards are clamped in position.

Immediately to the rear of the hillers is the combined coverer and fender 46 whose front 47 is of cowcatcher type and whose under surface is hollowed out at 48. This device is provided with a two-armed standard or hanger 49, the members of which are held by clamp brackets or straps 50 secured by bolts. On loosening the bolts, the standards can be adjusted vertically and reclamped. The coverer and fender smoothes off the top of the hill and at the same time casts aside any stones or other obstructions.

Rearward of the coverer and fender and in line therewith is a padder or tamper composed of a foot 51, a stem 52 slidable loosely through an aperture 53 in a cross piece 54 (Fig. 4) on the frame 1 and provided at its upper end with a reduced part 55 which passes loosely through a loop 56 on a crank 57 which has its end parts journaled in bearings 58 on frame 1. A coil spring 59 surrounds the reduced part 55 between the crank and the shoulder on stem 52, and a pin or the like 60, limits the loose motion of the padder or tamper. The shaft of the crank has a sprocket wheel 61 around which passes the sprocket chain 42. The sprocket wheel 61 is of such size that the tamper or padder is periodically brought down upon the hill at the point where the corn and fertilizer have been deposited so as to suitably compact the hill at those points, and the spring 59 causes this action to be made an elastic as well as a yielding one, thus compacting the soil in the best manner possible and also permitting the padder or tamper to yield if it strikes a stone or other hard substance.

I preferably provide an idler sprocket 62 adjustably carried by a bracket 63 (Fig. 1), whereby the tension of the sprocket chain 42 may be regulated. The handles 14 are preferably pivoted at their forward ends and are adjustably supported by standards or brackets so that they may be arranged to suit the height of the person using the machine.

It will be understood that my machine while principally adapted for the dropping of corn, may be used with other seeds, the seed slides being changed according to circumstances and, if desired, the sprocket wheels could be changed to regulate the action according to circumstances; also, that while the machine is designed to simultaneously drop fertilizer with the seed, the fertilizer may be omitted and the device used simply as a seed drill. Furthermore, at any time the handle 13 is operated, the operation of the seed slide and the padder will cease and thus when turning at the end of the furrow, I obviate the waste which would otherwise ensue, and the depositing of the seeds in a bunch. As the machine advances the point 16 opens the furrow and the seed, with or without the fertilizer, according to requirements, is dropped into the furrow which is afterward hilled by the shovels 45 to be subsequently covered by the coverer and thereafter tamped by the foot 51 at the places where the seeds are deposited. The foot 51 is used only when the fertilizer is dropped and the same is true of the fender 46. Both the padder and fender are removed when the fertilizer is not dropped and the machine is only used as a corn planter or seeder.

Various modifications might be resorted to in carrying out the invention without departing from the spirit and scope thereof.

Having thus described my invention, what I claim as new and desire to secure by Letters Patent, is:—

1. In a planter and hiller, the combination with a drill and a feeder, of hillers, a coverer and fender, and a periodically acting tamper.

2. In a planter and hiller, the combination with a drill, of fertilizer and seed dropping means adapted to simultaneously drop the seed and fertilizer in the furrow, hillers arranged to travel on opposite sides of the furrow to hill the same, a combined coverer and fender arranged to act after the hillers, and a periodically acting tamper arranged to tamp the places where the seed and fertilizer have been dropped.

3. In a planter and hiller, the combination of a drill, a feeder, hillers, a movable tamper, a traction wheel, means for operating the feeder and tamper from the traction wheel, and means for controlling the operation of said feeder and tamper.

4. In a planter and hiller, the combination with a frame, of a traction wheel, a driving wheel having a clutch connection with the traction wheel, a hand-operated device for controlling said clutch connection, a feeder, a wheel for driving said feeder, a drill, a tamper, a wheel for operating the tamper, and an operative connection between the wheels aforesaid, whereby the feeder and tamper are driven, said clutch controlling device enabling the feeder and tamper to be thrown out of operation.

In testimony whereof, I hereunto affix my signature in presence of two witnesses.

CHARLES H. NOELL.

Witnesses:
  J. M. DANIEL,
  S. S. LAMBETH, Jr.